(12) United States Patent
Kondo et al.

(10) Patent No.: US 7,894,956 B2
(45) Date of Patent: Feb. 22, 2011

(54) STEERING CONTROL DEVICE FOR VEHICLES

(75) Inventors: Satoshi Kondo, Wako (JP); Shinnosuke Ishida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 512 days.

(21) Appl. No.: 11/886,570

(22) PCT Filed: Mar. 16, 2006

(86) PCT No.: PCT/JP2006/305258
§ 371 (c)(1),
(2), (4) Date: Sep. 18, 2007

(87) PCT Pub. No.: WO2006/101005
PCT Pub. Date: Sep. 28, 2006

(65) Prior Publication Data
US 2009/0024278 A1 Jan. 22, 2009

(30) Foreign Application Priority Data
Mar. 22, 2005 (JP) .............................. 2005-082266

(51) Int. Cl.
*A01B 69/00* (2006.01)
(52) U.S. Cl. .......................................... 701/41; 701/42
(58) Field of Classification Search .................. 701/41, 701/1, 42; 348/148; 180/443
See application file for complete search history.

(56) References Cited

U.S. PATENT DOCUMENTS

| | | | | |
|---|---|---|---|---|
| 5,878,362 A | * | 3/1999 | Sekine et al. ................. | 701/41 |
| 6,718,241 B2 | * | 4/2004 | Kondo et al. ................... | 701/41 |
| 6,778,890 B2 | * | 8/2004 | Shimakage et al. ........... | 701/41 |
| 2003/0045982 A1 | * | 3/2003 | Kondo et al. ................... | 701/41 |
| 2003/0078712 A1 | * | 4/2003 | Shimakage et al. ........... | 701/41 |

FOREIGN PATENT DOCUMENTS

| | | |
|---|---|---|
| JP | 04-273301 A | 9/1992 |
| JP | 07-196048 A | 8/1995 |
| JP | 08-072731 A | 3/1996 |
| JP | 08-332969 A | 12/1996 |
| JP | 10-105232 A | 4/1998 |
| JP | 11-245832 A | 9/1999 |
| JP | 2001-010518 A | 1/2001 |
| JP | 2002-120744 A | 4/2002 |
| JP | 2003-154960 A | 5/2003 |

* cited by examiner

*Primary Examiner*—Mark Hellner
(74) *Attorney, Agent, or Firm*—Arent Fox LLP (57) ABSTRACT

A vehicle steering control device which prevents overshoot or a phase delay of a vehicle position from a target position when an actuator of a steering mechanism is controlled so that an integral control reduces a positional deviation of a vehicle from the reference position of a traffic lane. An FB control unit (60) which calculates a corrected steering assist torque (Tb) of a motor so as to reduce a positional deviation (Yd) and an angular deviation (Ah) includes an integral element determination unit (64), which determines an integral gain (Ki), by which the positional deviation (Yd) is multiplied in an integral gain operation unit (62), according to the positional deviation (Yd) and which determines a limit value (Icnt_lmt) of an integral controlled variable (Icnt) according to the positional deviation (Yd), and an integral controlled variable limiting unit (63) which limits the integral controlled variable (Icnt) to within a range set by the limit value (Icnt_lmt) and outputs the current integral controlled variable (Icnt_rel).

15 Claims, 5 Drawing Sheets

STEERING CONTROL DEVICE FOR VEHICLES

CROSS-REFERENCE TO RELATED APPLICATION

This application is a National Stage entry of International Application No. PCT/JP2006/305258, filed Mar. 16, 2006, the entire specification claims and drawings of which are incorporated herewith by reference.

TECHNICAL FIELD

The present invention relates to a vehicle steering control device which recognizes a traffic lane on a road and performs a vehicle steering control so that a vehicle travels along the traffic lane.

BACKGROUND ART

Conventionally, there is known a steering control device which recognizes a lane boundary line (white line) on a road from image data captured by an in-vehicle camera which is used to capture images of a road ahead of a vehicle and controls a moving direction of the vehicle by driving a steering mechanism using an electric power steering motor (EPS motor) so that the vehicle travels along the traffic lane bounded by the lane boundary line (for example, refer to Japanese publication of unexamined patent application No. 2003-154960).

If an output torque of the EPS motor is feedback controlled so that the vehicle position follows, for example, the center line of the traffic lane with reference to the center line, the vehicle may travel with the vehicle position diverging from the center line to some extent, instead of following the center line, in the case where a lateral external force is continuously applied to the vehicle such as where the traffic lane has a pitch designed to discharge water or a side wind is continuously applied to the vehicle.

Therefore, in order to prevent this situation, a target value of the output torque of the EPS motor has been determined by an integral control with an input of a positional deviation of the vehicle from the center line of the traffic lane (the lateral displacement of the vehicle from the center line of the traffic lane).

DISCLOSURE OF THE INVENTION

When performing the integral control with an input of the positional deviation of the vehicle from the reference position of the traffic lane as described above, there is a problem of overshoot or a phase delay that occurs when the vehicle position is settled to the target position if an integral gain is set too high in the integral control in order to cope with a large disturbance. Moreover, also in the case where the positional deviation of the vehicle from the reference position of the traffic lane rapidly increases due to a large disturbance and an integral controlled variable calculated by the integral control is excessive, there is a problem of overshoot or a phase delay that occurs when the vehicle position is settled to the target position.

Therefore, it is an object of the present invention to solve the above problems and to provide a vehicle steering control device for preventing overshoot or a phase delay of a vehicle position from a target position when the operation of an actuator of a steering mechanism is controlled so that the positional deviation of the vehicle from the reference position of the traffic lane can be reduced by an integral control.

The present invention has been provided to achieve the above object, and it relates to an improvement of a vehicle steering control device, comprising: a traffic lane recognition means which recognizes a traffic lane of a vehicle; a positional deviation calculation means which calculates a displacement of a vehicle position from a target position of the traffic lane as a positional deviation based on a recognition result of the traffic lane obtained by the traffic lane recognition means; an actuator which drives a steering mechanism that can steer steering wheels of the vehicle; a position correction controlled variable calculation means which calculates a position correction controlled variable which is a controlled variable of the actuator for use in decreasing the positional deviation by using the integral controlled variable calculated by an integration of the positional deviation; and an actuator controlled variable determination means which determines a target controlled variable of the actuator by using the position correction controlled variable.

The vehicle steering control device includes integral element determination means which performs at least one of an integral gain determination process of determining an integral gain by which the positional deviation is multiplied in the integration according to the positional deviation and an integral controlled variable limiting process of limiting the integral controlled variable to within a predetermined range set according to the positional deviation (which corresponds to claim 1).

According to this invention, the integral element determination means performs at least one of the integral gain determination process and the integral controlled variable limiting process. In the integral gain determination process, it is possible to reduce the positional deviation rapidly by determining the integral gain used to calculate the integral controlled variable according to the positional deviation, for example, by setting the integral gain relatively high if the positional deviation is large. In addition, if the positional deviation is small, the integral gain can be reduced to prevent overshoot or a phase delay when the vehicle position is converged to a target position. In the integral controlled variable limiting process, the integral controlled variable is limited to the predetermined range set according to the positional deviation, by which, for example, in the case where an integral value of the positional deviation gradually increases due to continuous occurrence of minute positional deviations, it is possible to prevent overshoot or a phase delay which may be caused by an excessive increase in the integral controlled variable and thus an increase in output of the actuator when the vehicle position converges to the target position.

The vehicle steering control device may further include vehicle detection means which detects a vehicle speed, and the integral element determination means may determine the integral gain according to the vehicle speed in the integral gain determination process (which corresponds to claim 2).

According to this invention, for example, if the vehicle is running at a high speed, the integral gain is set low, by which the vehicle behaviors can be stabilized by reducing the control input of the steering mechanism by the actuator during high speed running.

The vehicle steering control device may further include speed detection means which detects a vehicle speed, and the integral element determination means may set the predetermined range according to the vehicle speed in the integral controlled variable limiting process (which corresponds to claim 3).

According to this invention, for example, if the vehicle is running at a high speed, it is possible to prevent an unstable condition of the vehicle behaviors which may be caused by an excessive increase in the integral controlled variable by narrowing the predetermined range which limits the integral controlled variable. If the vehicle is running at a low speed, the predetermined range which limits the integral controlled variable is set large, by which it is possible to converge the vehicle position to the target position.

The vehicle steering control device may further include yaw rate detection means which detects a vehicle yaw rate, and the integral element determination means may determine the integral gain according to the vehicle yaw rate in the integral gain determination process (which corresponds to claim 4).

According to this invention, for example, if the vehicle yaw rate is high and high-speed rotations are performed in the vehicle, the integral gain is reduced to decrease the control input of the steering mechanism, thereby preventing the unstable condition of the vehicle behaviors.

Furthermore, the integral element determination means may determine the integral gain according to a degree of divergence between a frequency characteristic of an actual yaw rate value of the vehicle detected by the yaw rate detection means and a preset reference frequency characteristic in the integral gain determination process (which corresponds to claim 5).

According to this invention, the integral gain is determined according to the degree of divergence between the frequency characteristic of the actual yaw rate of the vehicle detected by the yaw rate detection means and the reference frequency characteristic, by which the operating characteristic of the vehicle to the operating speed of the steering wheels by the steering mechanism can be approximated to the reference frequency so as to achieve appropriate vehicle operationality of the steering mechanism.

The vehicle steering control device may further include yaw rate detection means which detects a vehicle yaw rate, and the integral element determination means may set the predetermined range according to the vehicle yaw rate in the integral controlled variable limiting process (which corresponds to claim 6).

According to this invention, for example, if the vehicle yaw rate is high and high-speed rotations are performed in the vehicle, the predetermined range which limits the integral controlled variable is reduced to decrease the control input of the steering mechanism, thereby preventing the unstable condition of the vehicle behaviors.

Furthermore, the integral element determination means may set the predetermined range according to a degree of divergence between the frequency characteristic of the actual yaw rate value of the vehicle detected by the yaw rate detection means and the preset reference frequency characteristic in the integral controlled variable limiting process (which corresponds to claim 7).

According to this invention, the predetermined range is set according to the degree of divergence between the frequency characteristic of the actual yaw rate of the vehicle detected by the yaw rate detection means and the reference frequency characteristic, by which the operating characteristic of the vehicle to the operating speed of the steering wheels by the steering mechanism can be approximated to the reference frequency so as to achieve appropriate vehicle operationality of the steering mechanism.

The vehicle steering control device may further include operating condition detection means which detects a driver's operating condition of the vehicle, and the integral element determination means may determine the integral gain according to the driver's operating condition of the vehicle detected by the operating condition detection means in the integral gain determination process (which corresponds to claim 8).

According to this invention, the integral gain is determined with the driver's operating condition reflected on the integral gain, by which it is possible to prevent the driver from experiencing discomfort through the driving of the steering mechanism.

The vehicle steering control device may further include operating condition detection means which detects a driver's operating condition of the vehicle, and the integral element determination means may set the predetermined range according to the driver's operating condition of the vehicle detected by the operating condition detection means in the integral controlled variable limiting process.

According to this invention, the predetermined range is set according to the driver's operating condition detected by the operating condition detection means, by which it is possible to prevent the driver from experiencing discomfort through the driving of the steering mechanism (which corresponds to claim 10).

Furthermore, torque detection means may be provided as the operating condition detection means to detect a torque according to a driver's operation applied to the wheel connected to the steering mechanism (which corresponds to claim 9 or 11).

According to this invention, it is possible to grasp the degree of driver's intention to change the direction of the vehicle according to the magnitude of the torque detected by the torque detection means. Therefore, the integral gain and the predetermined range are determined according to the degree of the driver's intention to change the direction of the vehicle, by which it is possible to prevent the driver from experiencing discomfort due to the vehicle behaviors against the driver's intension.

The vehicle steering control device may further include angular deviation calculation means which calculates a gradient of the moving direction of the vehicle with respect to the direction of the traffic lane as an angular deviation based on the recognition result of the traffic lane obtained by the traffic lane recognition means; and angle correction controlled variable calculation means which calculates an angle correction controlled variable which is a controlled variable of the actuator for use in decreasing the angular deviation according to the angular deviation and the positional deviation, and the actuator controlled variable determination means may determine the target controlled variable of the actuator by using the position correction controlled variable and the angle correction controlled variable (which corresponds to claim 12).

According to this invention, when controlling the moving direction of the vehicle to converge to the direction of the traffic lane by decreasing the angular deviation, for example, if the positional deviation is large, it is possible to control the vehicle to converge to the target position rapidly by increasing the angle correction controlled variable. If the positional deviation is small, the angle correction controlled variable is decreased, by which it is possible to prevent overshoot or hunting when the vehicle position is settled to the target position.

Furthermore, the target position of the traffic lane may be set around the center line of the traffic lane and the integral element determination means may determine the integral gain as a value depending on whether the positional deviation indicates that the vehicle position deviates to the right of the target position or the positional deviation indicates that the vehicle position deviates to the left of the target position in the gain determination process (which corresponds to claim 13).

According to this invention, if the right and the left of the center line of the traffic lane differ from each other in condition, for example, if the traffic lane is inclined from the left to the right in the width direction, the inclination of the traffic lane acts in such a way as to bring the vehicle closer to the center line in the case where the vehicle position deviates to the left from the center line, and therefore it is possible to prevent the overshoot or phase delay when the vehicle position is settled to the center line by reducing the integral gain to suppress the output of the actuator. Moreover, in the case where the vehicle position deviates to the right from the center line, the inclination of the traffic lane acts in such a way as to bring the vehicle away from the center line, and therefore it is possible to bring the vehicle position closer to the center line rapidly by increasing the integral gain to increase the output of the actuator.

Furthermore, the target position of the traffic lane may be set around the center line of the traffic lane, and the integral element determination means may set the predetermined range to a range depending on whether the positional deviation indicates that the vehicle position deviates to the right of the target position or the positional deviation indicates that the vehicle position deviates to the left of the target position in the integral controlled variable limiting process (which corresponds to claim 14).

According to this invention, if the right and the left of the center line of the traffic lane differ from each other in condition, for example, if the traffic lane is inclined from the left to the right in the width direction, the inclination of the traffic lane acts in such a way as to bring the vehicle closer to the center line in the case where the vehicle position deviates to the left from the center line, and therefore it is possible to prevent the overshoot or phase delay when the vehicle position is settled to the center line by reducing the predetermined range to limit the integral controlled variable to a small level so as to suppress the output of the actuator. Moreover, in the case where the vehicle position deviates to the right from the center line, the inclination of the traffic lane acts in such a way as to bring the vehicle away from the center line, and therefore it is possible to bring the vehicle position closer to the center line rapidly by extending the predetermined range to increase the integral controlled variable so as to increase the output of the actuator.

Furthermore, according to a vehicle equipped with one of the vehicle steering control devices corresponding to claim 1 to claim 14, the vehicle can travel while determining an appropriate target controlled variable of the actuator according to the positional deviation and controlling the operation of the steering mechanism via the actuator (which corresponds to claim 15).

BEST MODE FOR CARRYING OUT THE INVENTION

Figure 1:
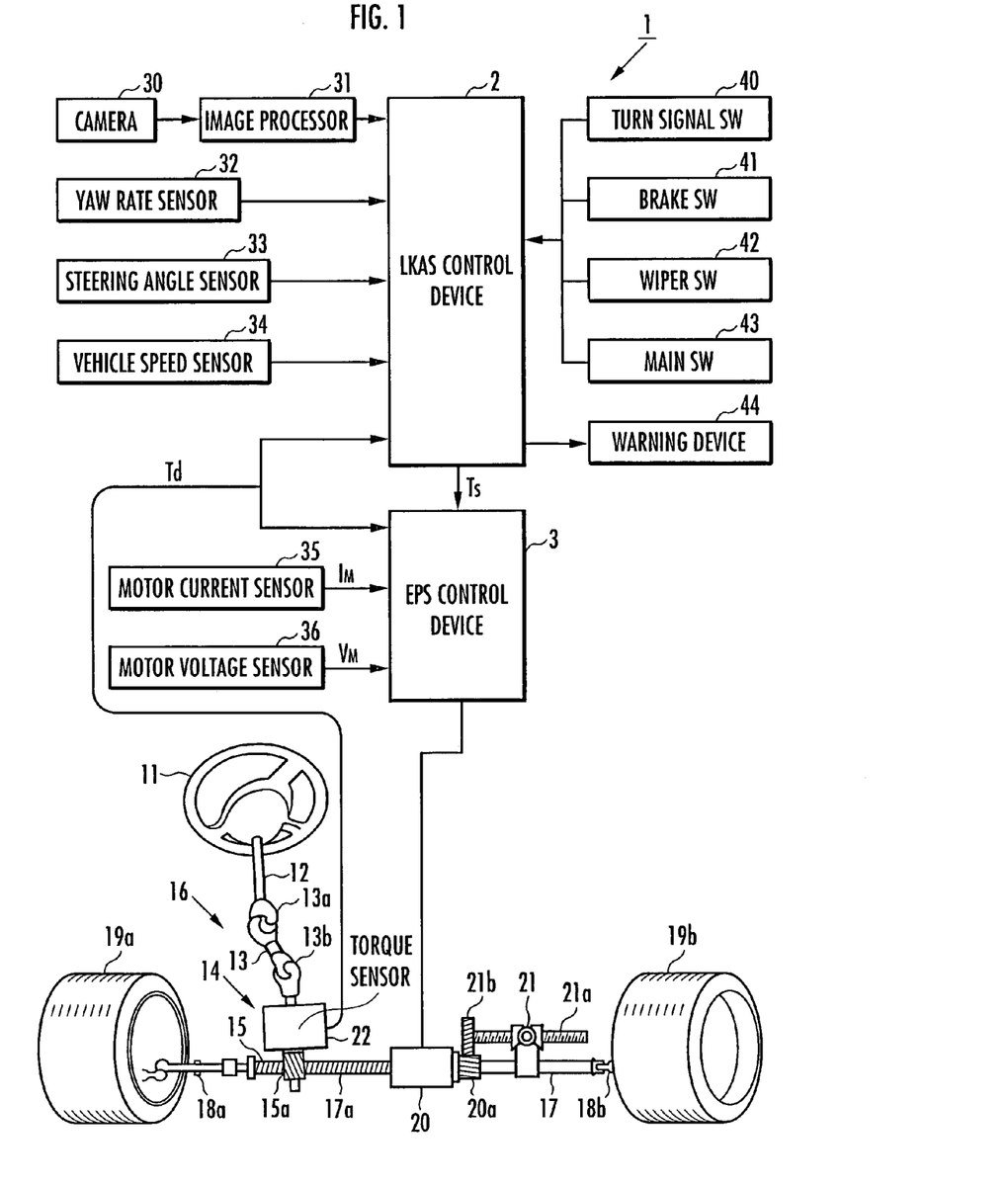
FIG. 1 is a general configuration diagram of a vehicle steering control device according to the present invention.
Figure 2:
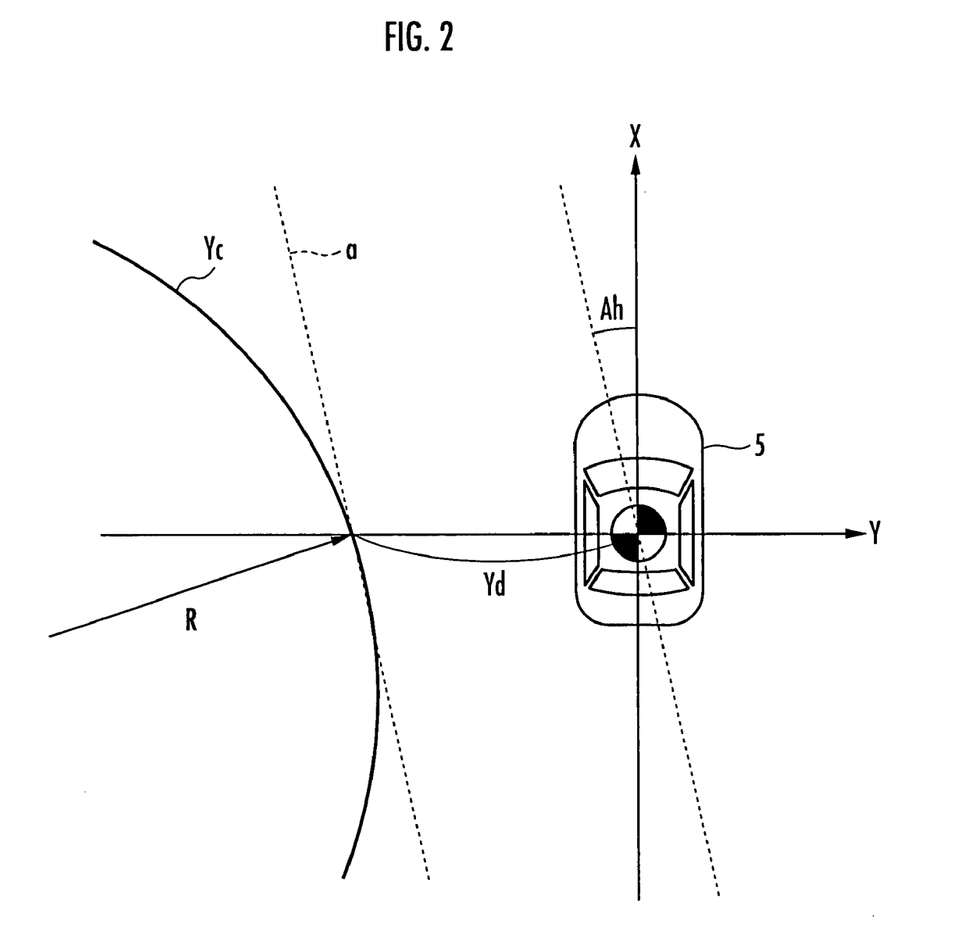
FIG. 2 is an explanatory diagram showing a positional deviation Yd of the vehicle and an angular deviation Ah thereof from a central axis Yc of a traffic lane having a curvature of 1/R.
Figure 3:
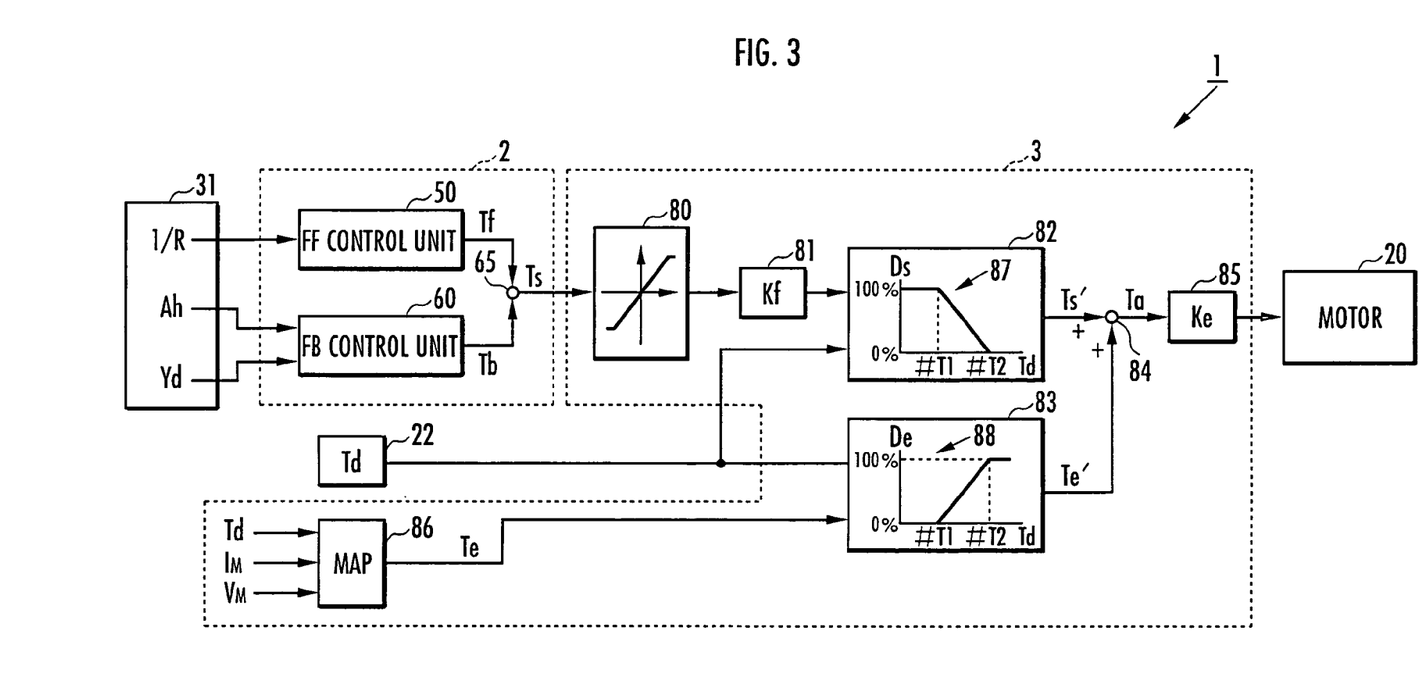
FIG. 3 is a control block diagram of the vehicle steering control device shown in FIG. 1.
Figure 4:
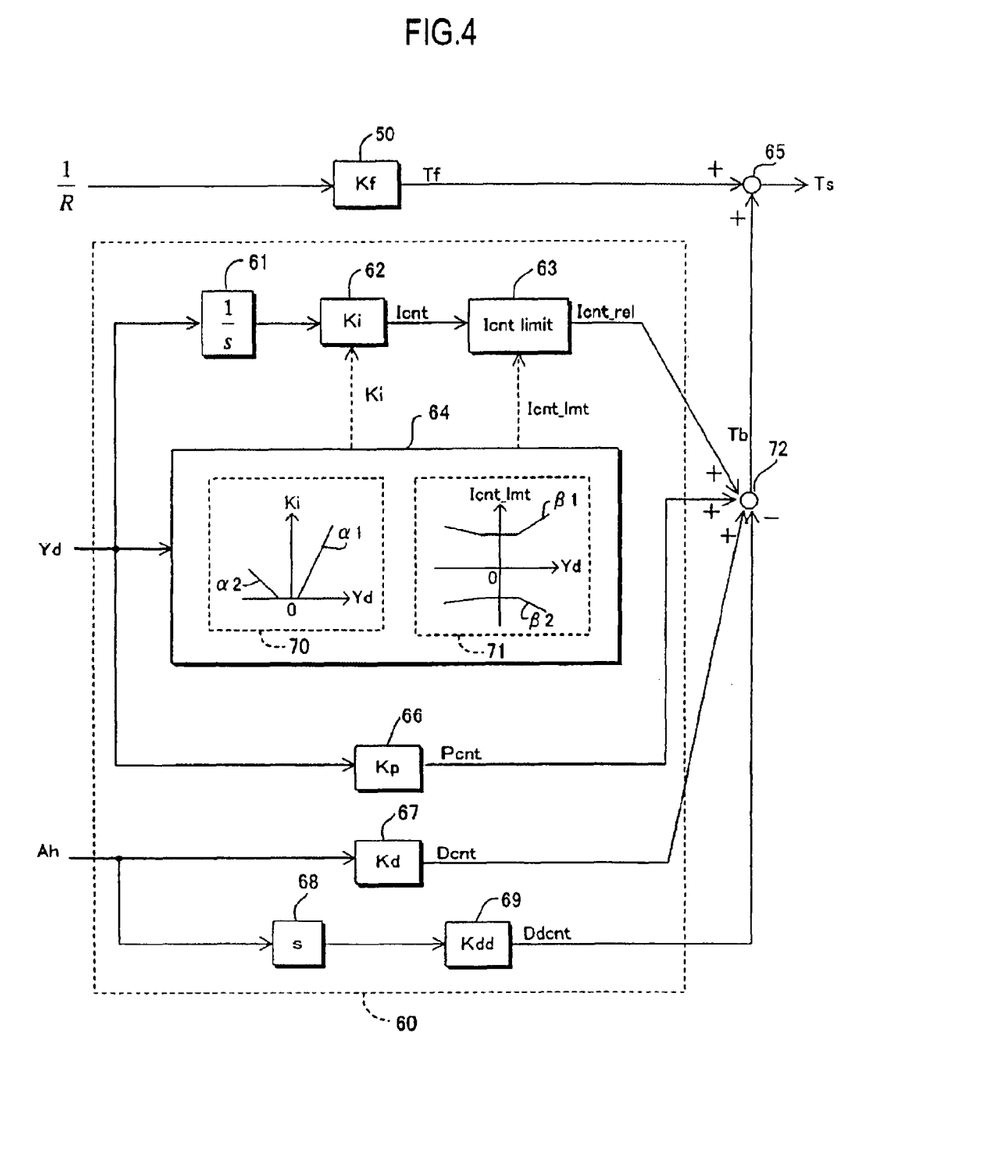
FIG. 4 is a control block diagram of an LKAS control device.
Figure 5:
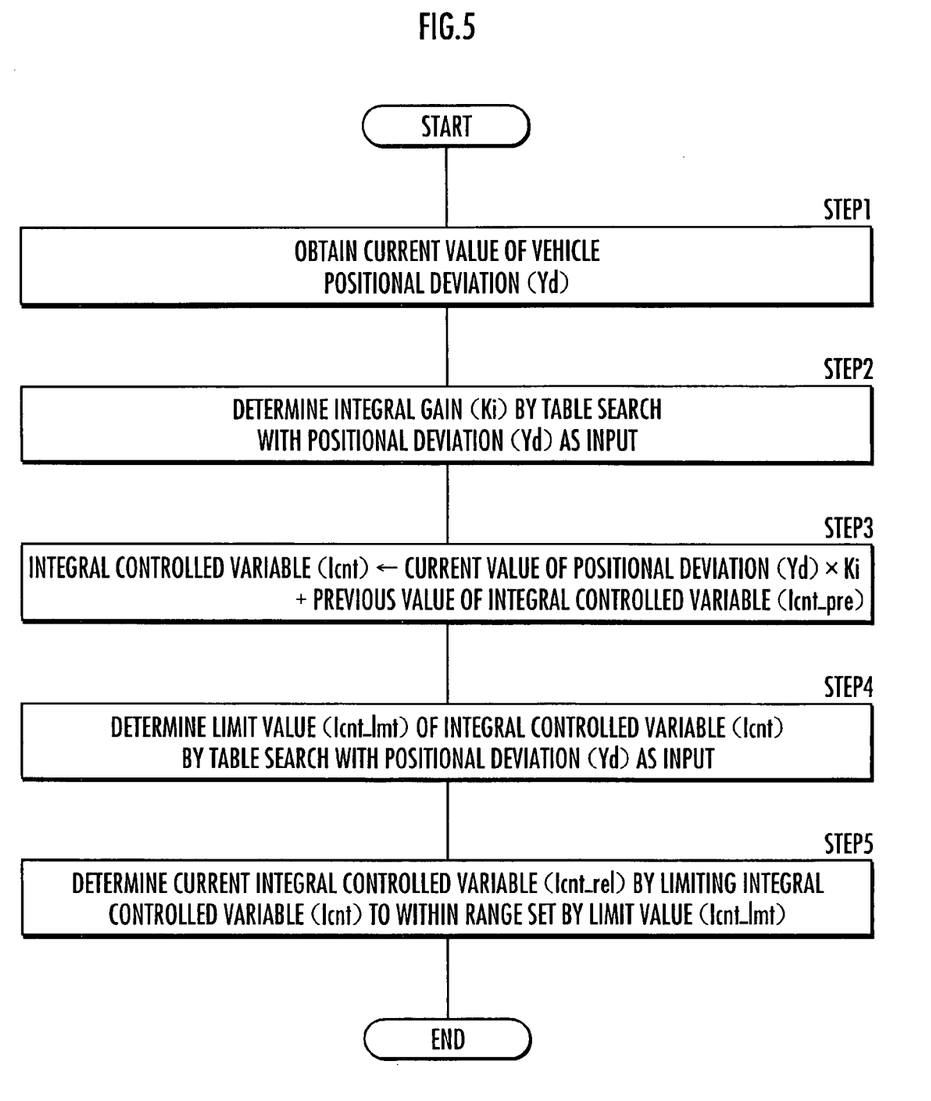
FIG. 5 is a flowchart showing a procedure for calculating an integral controlled variable Icnt_rel.

An embodiment of the present invention will be described with reference to FIG. 1 to FIG. 5. FIG. 1 shows a general configuration diagram of a vehicle steering control device according to the present invention; FIG. 2 shows an explanatory diagram illustrating a positional deviation Yd of a vehicle and an angular deviation Ah thereof from a center line Yc of a traffic lane having a curvature of 1/R; FIG. 3 shows a control block diagram of the vehicle steering control device shown in FIG. 1; FIG. 4 shows a control block diagram of an LKAS (lane keeping assistance system) control device; and FIG. 5 shows a flowchart of a procedure for calculating an integral controlled variable Icnt_rel.

Referring to FIG. 1, a steering shaft 12, which is provided integrally with a wheel 11 in a manual steering force generating mechanism 16 (corresponding to the steering mechanism of the present invention) which is a controlled object of a control device 1 of the vehicle, is connected to a pinion 15a of a rack and pinion mechanism 15 located in a steering gear box 14 via a connecting shaft 13 having universal joints 13a and 13b.

The pinion 15a engages with a rack gear 17a of a rack shaft 17 and a rotational movement of the wheel 11 is converted into a reciprocating movement of the rack shaft 17 via the pinion 15a, by which steering wheels 19a and 19b connected at both ends of the rack shaft 17 via tie rods 18a and 18b, respectively, are steered.

A motor 20 (corresponding to the actuator of the present invention) is arranged coaxially with the rack shaft 17 and a rotary output of the motor 20 is converted into a thrust force in the axial direction via a ball screw mechanism 21, which is provided substantially in parallel to the rack shaft 17. In other words, a driving side helical gear 20a is mounted on an output shaft of the motor 20, with the driving side helical gear 20a engaging with a helical gear 21b provided integrally with a shaft end of a screw shaft 21a of the ball screw mechanism 21.

The steering box 14 contains a torque sensor 22 (corresponding to the torque detection means and the operating condition detection means of the present invention) which detects a steering torque Td applied to the pinion 15a, namely a steering torque Td input from the wheel 11 by a driver's manual operation. A detection signal of the steering torque Td detected by the torque sensor 22 is input to a LKAS (lane keeping assistance system) control device 2 and an EPS (electronic power steering) control device 3.

The LKAS control device 2 calculates an assist amount of the output torque of the motor 20, which is required to run the vehicle along the traffic lane of the road in the vehicle moving direction, under various conditions. In addition, it outputs a steering assist torque Ts to the EPS control device 3 as a torque command for causing the motor 20 to output a torque of the assist amount.

In addition to the detection signal of the steering torque Td detected by the torque sensor 22, the LKAS control device 2 receives inputs of: information on a lane boundary line output from an image processor 31 described later; a detection signal from a yaw rate sensor 32 (corresponding to the yaw rate detection means of the present invention) which detects a yaw rate (rotational angular velocity) around the vertical (gravity) axis of the center-of-gravity of the vehicle; a detection signal from a steering angle sensor 33 which detects the direction and magnitude of the steering angle of a driver's operation by using a rotary encoder or the like provided in the steering shaft 12; and a detection signal from a vehicle speed sensor 34 (corresponding to the vehicle speed detection means of the present invention) which detects a rotational speed of traveling wheels.

Furthermore, the LKAS control device 2 receives inputs of: a turn-signal ON/OFF signal output from a turn signal switch 40; a brake ON/OFF signal output from a brake switch 41; a wiper ON/OFF signal output from a wiper switch 42; and a signal output from a main switch 43 for indicating that the LKAS control device 2 should be actuated or stopped.

Then, the LKAS control device 2 is set to stop the output of the assist torque Ts to the EPS control device 3, for example, if the turn-signal ON signal is input from the turn signal switch 40, if the brake ON signal is input from the brake switch 41, if the wiper ON signal is input from the wiper switch 42, if the signal indicating the stop of the LKAS control device 2 is input from the main switch 43, and if the LKAS control device 2 cannot recognize the lane boundary line.

Furthermore, the LKAS control device 2 is connected to a loudspeaker which outputs, for example, a warning sound or voice messages and to a warning device 44 having a display or the like which displays warnings and it is set to output a warning when the vehicle deviates from the traffic lane or the like.

Subsequently, the EPS control device 3 outputs a motor driving current for outputting the assist amount of the steering torque Td according to the running condition of the vehicle to the motor 20. Therefore, in addition to the detection signal of the steering assist torque Ts output from the LKAS control device 2 and that of the steering torque Td detected by the torque sensor 22, the EPS control device 3 receives inputs of a detection signal (motor current) $I_M$ from a motor current sensor 35 which detects an applied current of the motor 20 and a detection signal (motor voltage) $V_M$ from a motor voltage sensor 36 which detects an applied voltage of the motor 20.

The EPS control device 3 calculates an assist amount for user in power steering to assist the steering torque Td according to the steering torque Td detected by the torque sensor 22 in the EPS control mode. It then calculates a power steering torque Te as a torque command for causing the motor 20 to output a torque of the assist amount.

Thereafter, as described later, the EPS control device 3 sets a predetermined control ratio De (for example, a predetermined value of 100% or less) according to the steering torque Td and sets Te' obtained by multiplying the power steering torque Te by the control ratio De as a new power steering torque in the EPS control mode.

Furthermore, the EPS control device 3 sets a predetermined control ratio Ds (for example, a predetermined value of 100% or less) according to the steering torque Td detected by the torque sensor 22 and sets Ts' obtained by multiplying the steering assist torque Ts by the control ratio Ds as a new steering assist torque in the LKAS control mode.

The EPS control device 3 then calculates an assist torque Ta (corresponding to the target controlled variable of the actuator of the present invention) by adding the power steering torque Te' in the EPS control mode to the steering assist torque Ts' in the LKAS control mode and outputs the motor driving current for generating the assist torque Ta via a motor driving circuit (not shown). The function of the EPS control means 3 used to calculate the assist torque Ta corresponds to the actuator controlled variable determination means of the present invention.

In addition, the image processor 31 inputs image data of the lane ahead of the vehicle captured by a camera 30 mounted on the vehicle. It then recognizes the traffic lane boundary line (white line) which separates the traffic lanes based on the image data. In this operation, the image processor 31 calculates a curvature of 1/R of the traffic lane from a turning radius R of the center line Yc of the traffic lane in an appropriate position of the traffic lane as shown in FIG. 2.

Furthermore, the image processor 31 sets a relative coordinate system with the origin at the current position of the vehicle 5, the X axis along the moving direction of the vehicle 5, and the Y axis along the direction perpendicular to the X axis (the vehicle width direction) and calculates a distance (lateral displacement) Yd from the current position of the vehicle 5 on the Y axis to the center line Yc of the traffic lane as a positional deviation. Moreover, it calculates as an angular deviation an angle (vehicle deflection angle) Ah between the X axis and a tangent a of the center line Yc at the intersection point between the center line Yc of the traffic lane and the Y axis. The camera 30 and the image processor 31 constitute the traffic lane recognition means of the present invention.

Subsequently, the operations of the LKAS control device 2 and the EPS control device 3 will be described below with reference to FIG. 3. The LKAS control device 2 includes an FF (feedforward) control unit 50, a FB (feedback) control unit 60, and an addition unit 65. Then, the curvature 1/R calculated by the image processor 31 is input to the FF control unit 50 and the FF control unit 50 calculates a basic steering assist torque Tf by the feedforward control. Furthermore, the angular deviation Ah calculated by the image processor 31 and the positional deviation Yd are input to the FB control unit 60 and the FB control unit 60 calculates a corrected steering assist torque Tb by the feedback control.

The basic steering assist torque Tf is an assist torque for maintaining a vehicle balance against a cornering force, and the corrected steering assist torque Tb is an assist torque for running the vehicle along the center line Yc of the traffic lane or for securing the stability of the vehicle.

Thereafter, the addition unit 65 calculates the steering assist torque Ts for running the vehicle along the traffic lane by adding the basic steering assist torque Tf to the corrected steering assist torque Tb, and the steering assist torque Ts is input to a limit value setting unit 80 of the EPS control device 3.

The EPS control device 3 includes a limit value setting unit 80, a first control gain operation unit 81, an LKAS control ratio calculation unit 82, an EPS control ratio calculation unit 83, an addition unit 84, a second control gain operation unit 85, and a map 86 for use in setting the power steering torque Te.

The limit value setting unit 80 sets a limit value for the motor driving current supplied to the motor 20 or for the steering assist torque Ts. The first control gain operation unit 81 outputs a value obtained by multiplying the steering assist torque Ts by a predetermined first control gain Kf as a new steering assist torque Ts to the LKAS control ratio calculation unit 82.

The LKAS control ratio calculation unit 82 determines the control ratio Ds according to the steering torque Td by a map 87, into which the steering torque Td detected by the torque sensor 22 is input and from which the control ratio Ds is output, and then outputs a value obtained by multiplying the steering assist torque Ts by the control ratio Ds to the addition unit 84 as a new steering assist torque Ts'.

In the map 87, it is assumed that: the control ratio Ds is 100% if the steering torque Td is equal to or lower than a predetermined first torque #T1; the control ratio Ds gradually decreases if the steering torque Td is between the first torque #T1 and a predetermined second torque #T2; and the control ratio Ds is 0% if the steering torque Td is equal to or higher than the second torque #T2.

In addition, the EPS control ratio calculation unit 83 determines the control ratio De by a map 88, into which the steering torque Td detected by the torque sensor 22 is input and from which the control ratio De for the EPS control mode is output. It then outputs a value, which has been obtained by multiplying the control ratio De by the power steering torque Te obtained by the map 86 that provides a preset correspondence among the steering torque Td, the motor current $I_M$, the motor voltage $V_M$, and the power steering torque Te, to the addition unit 84 as a new power steering torque Te'.

In the map 88, it is set that: the control ratio De is 0% if the steering torque Td is equal to or lower than a predetermined first torque #T1; the control ratio De gradually increases if the steering torque Td is between the first torque #T1 and the predetermined second torque #T2; and the control ratio De is 100% if the steering torque Td is equal to or higher than the second torque #T2.

The addition unit 84 calculates an assist torque Ta of a torque target value generated by the motor 20 by adding a power steering torque Te' to the steering assist torque Ts'. The second control gain operation unit 85 calculates an applied current value for causing the motor 20 to generate the assist torque Ta by multiplying the assist torque Ta by a predetermined second control gain Ke and outputs a motor driving current of the applied current value to the motor 20.

Subsequently, a specific configuration of the LKAS control device 3 will be described below with reference to FIG. 4. The FF control unit 50 calculates a basic steering assist torque Tf by multiplying the curvature 1/R by a predetermined FF gain Kf. Furthermore, the FB control unit 60 includes an integral operation unit 61, an integral gain operation unit 62, an integral controlled variable limiting unit 63, an integral element determination unit 64, a proportional gain operation unit 66, a differential gain operation unit 67, an angle gain operation unit 67, a differential operation unit 68, and a differential gain operation unit 69.

The integral element determination unit 64 includes a map 70 for use in determining an integral gain Ki based on the positional deviation Yd and a map 71 for use in determining a limit value Icnt_lmt for use in limiting the output of the integral controlled variable Icnt to within a predetermined range based on the positional deviation Yd. Then, the integral element determination unit 64 performs an "integral gain determination process" to determine the integral gain Ki using the map 70.

Furthermore, the integral element determination unit 64 and the integral controlled variable limiting unit 63 perform an "integral controlled variable limiting process" in which the integral element determination unit 64 determines the limit value Icnt_lmt using the map 71 and the integral controlled variable limiting unit 63 limits the integral controlled variable Icnt based on the limit value Icnt_lmt. The integral element determination unit 64 and the integral controlled variable limiting unit 63 constitute the integral element determination means of the present invention.

Note here that the map 70 is set so that the larger the positional deviation Yd is, the higher the integral gain Ki is ($\alpha 1$ and $\alpha 2$ in FIG. 4). Therefore, if the positional deviation Yd is large, in other words, if a displacement of the vehicle is large with respect to the center line Yc (see FIG. 2) of the traffic lane, the integral gain Ki is high. This increases the calculated integral controlled variable Icnt and thus increases the steering assist torque Ts output from the LKAS control device 2, and therefore the output torque of the motor 20 increases, by which it is possible to bring the vehicle close to the center line Yc rapidly.

On the other hand, if the positional deviation Yd is small, the integral gain Ki is low. This decreases the calculated integral controlled variable Icnt and thus decreases the steering assist torque Ts output from the LKAS control device 2, and therefore the output torque of the motor 20 decreases. It is therefore possible to prevent overshoot or a phase delay which may be caused by an excessive output of the motor 20 when the vehicle position comes close to and is settled to the center line Yc.

Furthermore, in the map 70, for the same positional deviation Yd in absolute value, an integral gain Ki of a positive positional deviation Yd (0<Yd: referring to FIG. 2, a state where the position of the vehicle 5 deviates to the right of the center line Yc) is set larger than an integral gain Ki of a negative positional deviation Yd (Yd<0: referring to FIG. 2, a state where the position of the vehicle 5 deviates to the left of the center line Yc).

This supports the case where the traffic lane is inclined from left to right in the width direction: if the positional deviation Yd is positive (if the vehicle deviates to the right of the center line Yc), the inclination of the traffic lane acts in the direction of moving the vehicle away from the center line Yc, and therefore the integral gain Ki is increased to thereby increase the steering assist torque Ts, by which the output torque of the motor 20 is increased so that the vehicle position comes close to the center line Yc rapidly.

On the other hand, if the positional deviation Yd is negative (if the vehicle deviates to the left of the center line Yc), the inclination of the traffic lane acts in the direction of bringing the vehicle close to the center line Yc, and therefore the integral gain Ki is decreased to thereby decrease the steering torque Ts, by which the output torque of the motor 20 is decreased so as to prevent overshoot or a phase delay which may be caused by an excessive output of the motor 20 when the vehicle position is settled to the center line Yc.

Furthermore, in the map 71, the limit values Icnt_lmt of two positive and negative points ($\beta 1$ and $\beta 2$ in FIG. 4) are determined according to the positional deviation Yd. The integral controlled variable limiting unit 63 limits and outputs the integral controlled variable within the range set by the two limit values Icnt_lmt (negative Icnt_lmt $\leq$ Icnt $\leq$ positive Icnt_lmt: corresponding to the predetermined range of the present invention).

Then, the map 71 is set so that the larger the positional deviation Yd is, the higher the limit value Icnt_lmt of the integral limit value Icnt is. Therefore, if the positional deviation Yd is large, in other words, if a displacement of the vehicle is large with respect to the center line Yc (see FIG. 2) of the traffic lane, the limit range of the integral controlled variable Icnt extends. This increases the integral controlled variable Icnt_rel output from the integral controlled variable limiting unit 63, which thus increases the steering assist torque Ts output from the LKAS control device 2. Thereby, the output torque of the motor 20 increases and therefore the vehicle can be brought close to the center line Yc rapidly.

On the other hand, if the positional deviation Yd is small, in other words, if the displacement of the vehicle is small with respect to the center line Yc of the traffic lane, the limit range of the integral controlled variable Icnt narrows, which decreases the integral controlled variable Icnt_rel output from the integral controlled variable limiting unit 63. This decreases the steering assist torque Ts output from the FB control unit 60, and therefore the output torque of the motor 20 decreases. It is therefore possible to prevent overshoot or a phase delay which may be caused by an excessive output of the motor 20 when the vehicle position comes close to and is settled to the center line Yc.

Furthermore, in the map 71, for the same positional deviation Yd in absolute value where the absolute value of the positional deviation Yd exceeds a certain level, a setting range (negative Icnt_lmt $\leq$ Icnt $\leq$ positive Icnt_lmt) of the integral controlled variable Icnt obtained when the positional deviation Yd is positive (0<Yd: referring to FIG. 2, a state where the position of the vehicle 5 deviates to the right of the center line Yc) is set wider than a setting range of the integral controlled variable Icnt obtained when the positional deviation Yd is negative (Yd<0: referring to FIG. 2, a state where the position of the vehicle 5 deviates to the left of the center line Yc).

Similarly to the map 70, this supports the case where the traffic lane inclines from left to right in the width direction: if the positional deviation Yd is positive (if the vehicle deviates to the right of the center line Yc), the inclination of the traffic lane acts in the direction of moving the vehicle away from the center line Yc. Therefore, the setting range of the integral controlled variable Icnt is extended to thereby increase the steering assist torque Ts, by which the output torque of the motor 20 is increased so that the vehicle position comes close to the center line Yc rapidly.

On the other hand, if the positional deviation Yd is negative (if the vehicle deviates to the left of the center line Yc), the inclination of the traffic lane acts in the direction of bringing the vehicle close to the center line Yc. Therefore, the setting range of the integral controlled variable Icnt is narrowed to decrease the steering torque Ts, by which the output torque of the motor 20 is decreased so as to prevent overshoot or a phase delay which may be caused by an excessive output of the motor 20 when the vehicle position is settled to the center line Yc.

The FB control unit 60 calculates the integral controlled variable Icnt_rel according to the flowchart shown in FIG. 5. First, the FB control unit 60 obtains a current value of the positional deviation Yd of the vehicle in step 1 and determines an integral gain Ki in a search process of the map 70 using the integral element determination unit 64 in the next step 2. Then, in step 3, it calculates the current integral controlled variable Icnt_rel by multiplying the positional deviation Yd by the integral gain Ki using the integral gain operation unit 62 and adding the previous value of the integral controlled variable (the integral controlled variable Icnt_rel calculated in the previous control cycle) to the multiplication result using the integral operation unit 61.

In the next step 4, the FB control unit 60 determines the limit value Icnt_lmt of the integral controlled variable Icnt in a search process of the map 71 using the integral element determination unit 64. In this case, two points, namely the positive (β1 in FIG. 4) and negative (β2 in FIG. 4) points are determined as Icnt_lmt.

Then, in the next step 5, the FB control unit 60 determines the current integral controlled variable Icnt_rel by limiting the integral controlled variable to within the range set by Icnt_lmt (the negative Icnt_lmt≦Icnt≦the positive Icnt_lmt) using the integral controlled variable limiting unit 63.

In addition, the FB control unit 60 calculates a proportional controlled variable Pcnt by multiplying the positional deviation Yd by a predetermined proportional gain Kp using a proportional gain operation unit. Furthermore, the FB control unit 60 calculates an angle controlled variable Dcnt by multiplying the angular deviation Ah by the angle gain Kd using the angle gain operation unit 67 and calculates an angle differential controlled variable Ddcnt by multiplying a value, which has been obtained by differentiating an angular deviation Ah using the differential operation unit 68, by a differential gain Kdd using the differential gain operation unit 69.

The FB control unit 60 calculates the corrected steering assist torque Tb by adding the integral controlled variable Icnt_rel, the proportional controlled variable Pcnt, and the angle controlled variable Dcnt calculated as described above and subtracting the angle differential controlled variable Ddcnt from the result of addition. An added value obtained by adding the integral controlled variable Icnt_rel and the proportional controlled variable Pcnt corresponds to the position correction controlled variable of the present invention and the angle controlled variable Dcnt corresponds to the angle correction controlled variable of the present invention.

Then, the LKAS control device 2 calculates the steering assist torque Ts by adding the basic steering assist torque Tf calculated by the FF control unit 50 to the corrected steering assist torque Tb calculated by the FB control unit 60 using the addition unit 65.

Although the integral element determination unit 64 has performed the "integral gain determination process" in which the integral gain Ki is determined according to the magnitude of the positional deviation Yd and the "integral controlled variable limiting process" in which the limit value Icnt_lmt of the integral controlled variable Icnt is determined according to the magnitude of the positional deviation Yd and the integral controlled variable Icnt is limited to within the range set by the limit value Icnt_lmt as shown in FIG. 4 in this embodiment, the effect of the present invention can also be achieved by performing only one of these processes.

Moreover, in the "integral gain determination process," the integral gain Ki can be determined according to a vehicle speed of the vehicle detected by the vehicle speed sensor 34, a yaw rate of the vehicle detected by the yaw rate sensor 32, and a driver's operating force applied to the wheel detected by the torque sensor 22 or the like, in addition to the positional deviation Yd.

In this condition, for example, in the case of a reduction in the driver's operating force detected by the torque sensor 22, it is also possible to output a warning by the warning device 44 and to increase the steering assist torque Ts by performing a process of increasing the integral gain Ki to thereby increase the effect of bringing the vehicle close to the center line Yc.

Furthermore, also in the "integral controlled variable limiting process," it is possible to determine the limit value Icnt_lmt of the integral controlled variable to limit the integral controlled variable Icnt_rel to within the range set by the limit value Icnt_lmt according to the vehicle speed of the vehicle detected by the vehicle speed sensor 34, the yaw rate of the vehicle detected by the yaw rate sensor 32, and the driver's operating force applied to the wheel detected by the torque sensor 22, in addition to the positional deviation Yd.

Also in the above, in the case of a reduction in the driver's operating force applied to the wheel 11 detected by the torque sensor 22, it is possible to output a warning by the warning device 44 and to extend the setting range of the integral controlled variable Icnt set by the limit value Icnt_lmt of the integral controlled variable so that the steering assist torque Ts increases to thereby increase the effect of bringing the vehicle close to the center line Yc.

Furthermore, in the "integral gain determination process," it is also possible to compare a preset reference frequency characteristic of the yaw rate of the vehicle with a frequency characteristic of an actual yaw rate value detected by the yaw rate sensor 32 and to determine the integral gain K according to a degree of divergence of the actual frequency characteristic from the reference frequency characteristic. In addition, the frequency characteristic of the actual yaw rate of the vehicle can be detected based on the vehicle speed detected by the vehicle speed sensor 34 and the steering angle detected by the steering angle sensor 33.

Moreover, it is also possible to detect the driver's operating condition based on, for example, a force on a brake pedal or an accelerator pedal or the like, besides the torque detected by the torque sensor 22, to determine the integral gain Ki according to the operating condition.

Also in the "integral controlled variable limiting process," it is possible to determine the limit value Icnt_lmt of the integral controlled variable according to the vehicle speed of the vehicle detected by the vehicle speed sensor 34, the yaw rate of the vehicle detected by the yaw rate sensor 32, the driver's operating force applied to the wheel detected by the torque sensor 22, or the like, besides the positional deviation Yd, to limit the current value Icnt_rel of the integral controlled variable within the range set by the limit value Icnt_lmt.

Furthermore, in the "integral gain determination process," it is possible to compare the preset reference frequency characteristic of the yaw rate of the vehicle with the actual frequency characteristic detected by the yaw rate sensor 32 and to determine the limit value Icnt_lmt of the integral controlled variable according to a degree of divergence of the actual frequency characteristic from the reference frequency characteristic in order to limit the current value Icnt_rel of the integral controlled variable to within the range set by the limit value Icnt_lmt.

Furthermore, it is possible to detect the driver's operating condition based on, for example, a force on the brake pedal or the accelerator pedal or the like, besides the torque detected by the torque sensor 22, to determine the limit value Icnt_lmt of the integral controlled variable according to the operating condition in order to limit the current value Icnt_rel of the integral controlled variable to within the range set by the limit value Icnt_lmt.

Still further, it is possible to calculate the angle controlled variable Dcnt according to the angular deviation Ah and the positional deviation Yd by determining the angle gain Kd in the angle gain operation unit 67 shown in FIG. 4 according to the magnitude of the positional deviation Yd.

DESCRIPTION OF NUMERICAL REFERENCES

1 . . . controlled object of a control device of the vehicle; 2 . . . LKAS (lane keeping assistance system) control device; 3 . . . EPS (electronic power steering) control device; 11 . . . wheel; 16 . . . manual steering force generating mechanism (steering mechanism); 20 . . . motor; 22 . . . torque sensor; 30 . . . camera; 31 . . . image processor; 32 . . . yaw rate sensor; 33 . . . steering angle sensor; 34 . . . vehicle speed sensor; 50 . . . FF (feedforward) control unit; 60 . . . FB control unit; 61 . . . integral operation unit; 62 . . . integral gain operation unit; 63 . . . integral controlled variable limiting unit; 64 . . . integral element determination unit; 66 . . . proportional gain operation unit; 67 . . . angle gain operation unit; 68 . . . differential operation unit; 69 . . . differential gain operation unit.

The invention claimed is:

1. A vehicle steering control device, comprising:
 a traffic lane recognition means which recognizes a traffic lane of a vehicle;
 a positional deviation calculation means which calculates a displacement of a vehicle position from a target position of the traffic lane as a positional deviation based on a recognition result of the traffic lane obtained by the traffic lane recognition means;
 an actuator which drives a steering mechanism that can steer steering wheels of the vehicle;
 a position correction controlled variable calculation means which calculates a position correction controlled variable which is a controlled variable of the actuator for use in decreasing the positional deviation by using an integral controlled variable calculated by an integration of the positional deviation;
 an actuator controlled variable determination means which determines a target controlled variable of the actuator by using the position correction controlled variable; and
 an integral element determination means which performs at least one of an integral gain determination process of determining an integral gain by which the positional deviation is multiplied in the integration according to the positional deviation and an integral controlled variable limiting process of limiting the integral controlled variable to within a predetermined range set according to the positional deviation.

2. A vehicle steering control device according to claim 1, further comprising vehicle detection means which detects a vehicle speed, wherein the integral element determination means determines the integral gain according to the vehicle speed in the integral gain determination process.

3. A vehicle steering control device according to claim 1, further comprising speed detection means which detects a vehicle speed, wherein the integral element determination means sets the predetermined range according to the vehicle speed in the integral controlled variable limiting process.

4. A vehicle steering control device according to claim 1, further comprising yaw rate detection means which detects a vehicle yaw rate, wherein the integral element determination means determines the integral gain according to the vehicle yaw rate in the integral gain determination process.

5. A vehicle steering control device according to claim 4, wherein the integral element determination means determines the integral gain according to a degree of divergence between a frequency characteristic of an actual yaw rate value of the vehicle detected by the yaw rate detection means and a preset reference frequency characteristic in the integral gain determination process.

6. A vehicle steering control device according to claim 1, further comprising yaw rate detection means which detects a vehicle yaw rate, wherein the integral element determination means sets the predetermined range according to the vehicle yaw rate in the integral controlled variable limiting process.

7. A vehicle steering control device according to claim 6, wherein the integral element determination means sets the predetermined range according to a degree of divergence between the frequency characteristic of the actual yaw rate value of the vehicle detected by the yaw rate detection means and the preset reference frequency characteristic in the integral controlled variable limiting process.

8. A vehicle steering control device according to claim 1, further comprising operating condition detection means which detects a driver's operating condition of the vehicle, wherein the integral element determination means determines the integral gain according to the driver's operating condition of the vehicle detected by the operating condition detection means in the integral gain determination process.

9. A vehicle steering control device according to claim 8, wherein torque detection means is provided as the operating condition detection means to detect a torque according to a driver's operation applied to the wheel connected to the steering mechanism.

10. A vehicle steering control device according to claim 1, further comprising operating condition detection means which detects a driver's operating condition of the vehicle, wherein the integral element determination means sets the predetermined range according to the driver's operating condition of the vehicle detected by the operating condition detection means in the integral controlled variable limiting process.

11. A vehicle steering control device according to claim 10, wherein torque detection means is provided as the operating condition detection means to detect a torque according to a driver's operation applied to the wheel connected to the steering mechanism.

12. A vehicle steering control device according to claim 1, further comprising:
   angular deviation calculation means which calculates a gradient of the moving direction of the vehicle with respect to the direction of the traffic lane as an angular deviation based on the recognition result of the traffic lane obtained by the traffic lane recognition means; and
   angle correction controlled variable calculation means which calculates an angle correction controlled variable which is a controlled variable of the actuator for use in decreasing the angular deviation according to the angular deviation and the positional deviation,
   wherein the actuator controlled variable determination means determines the target controlled variable of the actuator by using the position correction controlled variable and the angle correction controlled variable.

13. A vehicle steering control device according to claim 1, wherein:
   the target position of the traffic lane is set around the center line of the traffic lane; and
   the integral element determination means determines the integral gain as a value depending on whether the positional deviation indicates that the vehicle position deviates to the right of the target position or the positional deviation indicates that the vehicle position deviates to the left of the target position in the gain determination process.

14. A vehicle steering control device according to claim 1, wherein:
   the target position of the traffic lane is set around the center line of the traffic lane; and
   the integral element determination means sets the predetermined range to a range depending on whether the positional deviation indicates that the vehicle position deviates to the right of the target position or the positional deviation indicates that the vehicle position deviates to the left of the target position in the integral controlled variable limiting process.

15. A vehicle equipped with one of the vehicle steering control devices according to claim 1 to claim 14.

* * * * *